US010466724B2

(12) United States Patent
Caron et al.

(10) Patent No.: US 10,466,724 B2
(45) Date of Patent: Nov. 5, 2019

(54) PROGRAMMABLE PERIPHERAL UNIT FOR BUILDING AUTOMATION SYSTEMS

(71) Applicant: SCL ELEMENTS INC., Montreal (CA)

(72) Inventors: Simon Caron, Montreal (CA); Hami Monsarrat-Chanon, Montreal (CA); Simon Leblond, Montreal (CA)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 0 days.

(21) Appl. No.: 15/822,757

(22) Filed: Nov. 27, 2017

(65) Prior Publication Data
US 2018/0299914 A1 Oct. 18, 2018

Related U.S. Application Data

(63) Continuation of application No. 14/374,041, filed as application No. PCT/CA2013/000064 on Jan. 23, 2013, now abandoned.

(60) Provisional application No. 61/589,831, filed on Jan. 23, 2012.

(51) Int. Cl.
G05B 21/00 (2006.01)
G05D 23/19 (2006.01)
G05B 15/02 (2006.01)
G06F 11/07 (2006.01)
F24F 11/30 (2018.01)
F24F 110/00 (2018.01)
F24F 11/56 (2018.01)

(52) U.S. Cl.
CPC .......... *G05D 23/1917* (2013.01); *F24F 11/30* (2018.01); *G05B 15/02* (2013.01); *G06F 11/0793* (2013.01); *F24F 11/56* (2018.01); *F24F 2110/00* (2018.01); *G05B 2219/2614* (2013.01)

(58) Field of Classification Search
None
See application file for complete search history.

(56) References Cited

U.S. PATENT DOCUMENTS

| 2005/0049754 | A1 | 3/2005 | Ogawa et al. |
| 2006/0097063 | A1 | 5/2006 | Zeevi |
| 2007/0194728 | A1* | 8/2007 | Beifus ............ G05B 19/0423 318/66 |
| 2009/0065596 | A1 | 3/2009 | Seem et al. |

FOREIGN PATENT DOCUMENTS

| CA | 2758890 A1 | 10/2010 |
| WO | 9307549 A2 | 4/1993 |
| WO | 9708914 A1 | 3/1997 |
| WO | 2011035438 A1 | 3/2011 |

OTHER PUBLICATIONS

European Search Report dated Oct. 13, 2015 for EP13740747.
International Search Report dated Apr. 9, 2013 for PCT/CA2013/000064.

* cited by examiner

*Primary Examiner* — Wissam Rashid
(74) *Attorney, Agent, or Firm* — Lando & Anastasi, LLP

(57) ABSTRACT

The embodiments describe programmable peripheral units for use in a building automation system. The program-mable peripheral units communicate with controllers and other system components. The programmable peripheral units have end device components to actuate the building environment.

17 Claims, 5 Drawing Sheets

PROGRAMMABLE PERIPHERAL UNIT FOR BUILDING AUTOMATION SYSTEMS

This application is a Continuation of U.S. patent application Ser. No. 14/374,041, filed on Jan. 23, 2013, titled "PROGRAMMABLE PERIPHERAL UNIT FOR BUILDING AUTOMATION SYSTEMS," which is a U.S. National Stage Application under 35 U.S.C. § 371 from International Application No. PCT/CA2013/000064, filed on Jan. 23, 2013, titled "PROGRAMMABLE PERIPHERAL UNIT," which claims priority to 61/589,831, filed on Jan. 23, 2012, all of which are hereby incorporated herein by reference.

FIELD

The present invention relates to a programmable peripheral unit for a building automation system, and systems and methods associated therewith.

INTRODUCTION

A building automation system (BAS) is a control system for a building. The control system is a computerized network of controllers and peripherals units, such as sensors and actuators, for example, designed to monitor and control the building's environment. This computerized network of controllers and peripherals units may form part of the mechanical and lighting systems in a building. For example, a BAS may keep the building climate within a specified range, provide lighting based on an occupancy schedule, and monitor system performance and device failures. BAS networks may include a bus which connects controllers with peripheral units, such as input/output devices, and a user interface for data communication. Typically, controllers are purpose-built computers with input and output capabilities. Inputs allow a controller to read temperatures, humidity, pressure, current flow, and airflow, for example. Outputs allow the controller to send command and control signals to other parts of the BAS and peripheral units.

A peripheral unit is a hardware device that may include end device components to actuate the building environment. Examples of peripheral units include actuators, temperature sensors, application specific input/output devices, relay packs, valves, motors, heating systems, cooling systems, and so on.

There exists a need to provide an improved peripheral unit for a BAS, or at least provide an alternative. There further exists a need to provide an improved wireless peripheral unit, or at least an alternative. Finally, there exists a need to provide improved methods and systems for managing wireless peripheral units, or at least provide alternatives.

DRAWINGS

For a better understanding of embodiments of the systems and methods described herein, and to show more clearly how they may be carried into effect, reference will be made, by way of example, to the accompanying drawings in which.

Figure 1:
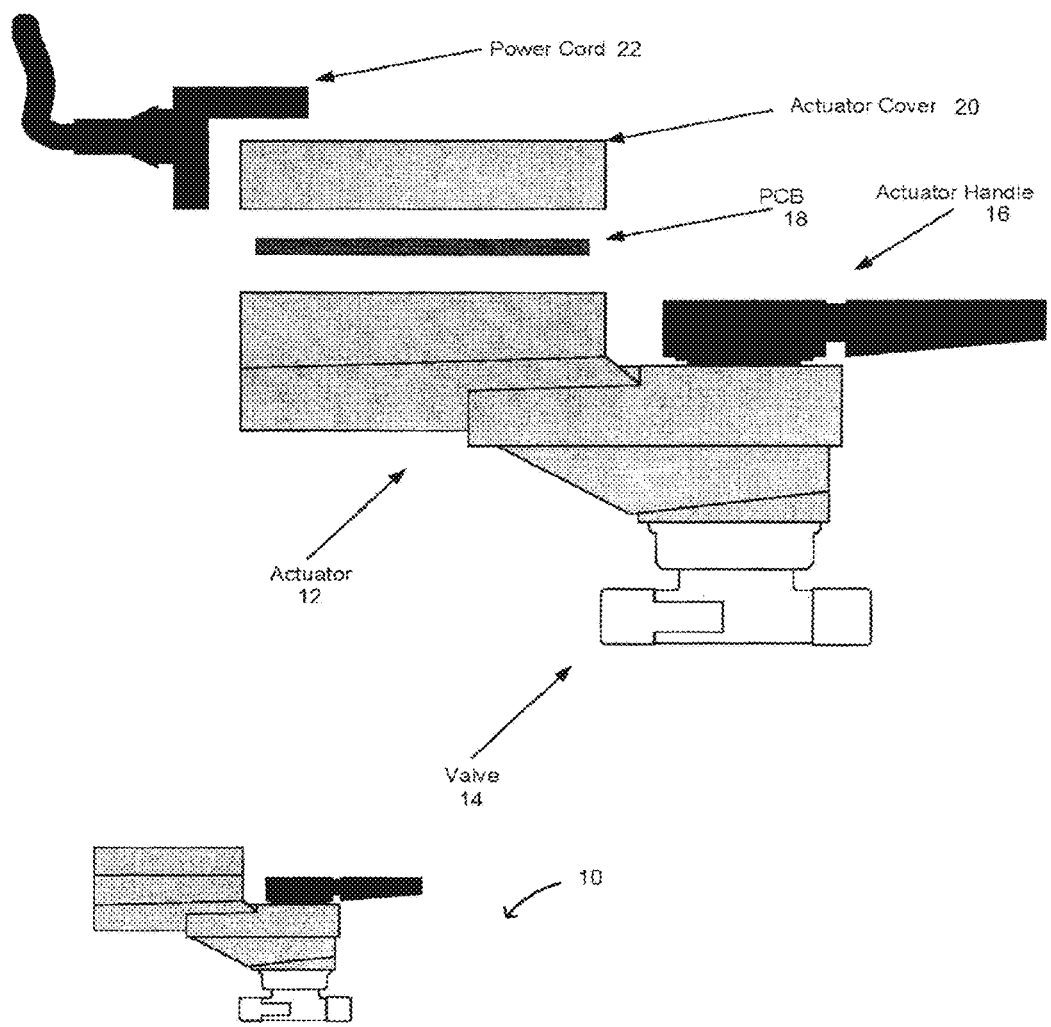
FIG. 1 illustrates a peripheral unit in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. These embodiments may be implemented in hardware devices or computer programs executing on programmable devices. A device may include at least one processor, a data storage system (including volatile memory or non-volatile memory or other data storage elements or a combination thereof), and at least one communication interface. For example, suitable programmable devices may include a peripheral unit, controller, server, network appliance, set-top box, embedded device, computer expansion module, personal computer, laptop, personal data assistant, mobile device or any other computing device capable of being configured to carry out the methods and implement the systems described herein. Program code is applied to input data to perform the functions described herein and to generate output information. The output information is applied to one or more output devices. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and a combination thereof.

Each program may be implemented in a programming or scripting language, such as high level procedural or object oriented programming or scripting language, or both, to communicate with other components of the system. However, alternatively the programs may be implemented in assembly or machine language, if desired. The language may be a compiled or interpreted language. The language may also be dynamically translated using a just-in-time compiler for example. The program code may be in various representations such as pre-compiled program code, intermediate program code, and so on. Each such computer program may be stored on a storage media (e.g. ROM, magnetic disk, optical disc), readable by a general or special purpose programmable device, for configuring and operating the device when the storage media is read by the device to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for execution by one or more processors. The medium may be provided in various forms, including one or more diskettes, compact disks, tapes, chips, magnetic and electronic storage media, and the like. The computer useable instructions may also be in various forms, including compiled and non-compiled code, as well as intermediate code representations.

The communication bus of a BAS network (which may also be referred to as a control network) may be wired, wireless, input/output, or a combination thereof. A wired communication system may have significant installation costs, such as material and labor for example. Wireless solutions may reduce installations costs and may also provide efficient and flexible alternatives. However, wireless communication systems may be associated with limitations. For example, the cost of wireless devices may be significantly higher than wired alternatives. As another example, wireless communication systems may be prone to network disconnect which may result in communication or network failure. Network failure may create additional issues for application-specific peripheral devices where there is no local computing intelligence as these peripheral devise may not be able to function without access to network communication to receive commands, and so on.

In accordance with embodiments described herein, a BAS may include programmable wireless peripheral devices, which may also be referred to as peripheral units. The programmable wireless peripheral device may receive programs from controllers and store the programs locally in memory. The peripheral device may have a processor to execute the programs to control the function of the peripheral device. The local programs control the operation of the peripheral device even in the event of network failure. The programming may configure the peripheral device to have various modes of operation such as normal or fail safe mode, for example. The scripts and programming that may be pushed to the programmable wireless peripheral devices are not limited to fail safe or fall back operations and may also configure normal operation and functionality of the devices.

Referring now to FIG. 1 there is shown a peripheral unit 10 in accordance with an example embodiment. In this example, the peripheral unit 10 may include an actuator 12 mounted with a valve 14. The peripheral unit 10 may also include an actuator handle 16, polychlorinated biphenyl (PCB) 18, an actuator cover 20, and a power cord 22. The peripheral unit 10 forms part of a BAS and communicates with other components such as controllers, gateways, host computers, other peripheral units, and so on.

A peripheral unit 10 may be a hardware device capable of communication with controllers and a central server of a BAS. A control network of a BAS may connect a central server to controllers, and controller to peripheral units. A peripheral unit 10 includes one or more end device components that physically actuate the building's environment. Examples of peripheral units include actuators, temperature sensors, application specific input/output devices, relay packs, valves, motors, heating systems, cooling systems, and so on. Peripheral units may be used as part of the air, cooling, heating, water, lighting, and metering applications for a building. A peripheral unit 10 may include a communication interface such as wireless, wired, or other form of input/out such as analog or digital input/output. The peripheral unit 10 may connect to a zone controller to receive programs from zone controllers of the BAS, and exchange data with the zone controllers. A peripheral unit may have limited resources in view of operation constraints, such as cost, size, power consumption, which may result in limited resources for memory and processing capability.

The peripheral unit will be configured with sufficient memory to store programs to customize the control of the end device components, including a normal mode of operation and a fail safe mode of operation. The scripts and programming that may be pushed to the programmable wireless peripheral devices are not limited to fail safe or fall back operations and may also configure normal operation and functionality of the devices. The peripheral unit 10 will also be configured with sufficient processing capability to provide an embedded interpreter to process the programs to control the operation of the peripheral unit. The peripheral unit 10 may use an interpreter to translate programs of a different of formats or representations in a variety of ways. For example, a system may have program code that is compiled, which may be static and may not be updated "live" at runtime. Updating code live may have business value by providing the ability to adjust new settings or insert new components, for example. The peripheral unit 10 and its interpreter may enable live updates to program code. For example, the peripheral unit 10 may enable live updates to program code by using an intermediate code representation, pre-compiled code as part of the interpreter, and so on. Further, the peripheral unit 10 and its interpreter may be configured to provide just-in-time compilation, a technique in which the intermediate representation is compiled to native machine code at runtime. Using just-in-time compilation may provide performance advantages and efficiency for the peripheral unit 10.

The peripheral unit 10 may include wireless communication hardware and a programmable processor and memory for storing the programs. The peripheral unit 10 has actuation capability and can physically control end device components, and in some cases other components of the BAS in order to physically adjust components of the BAS. That is, the peripheral unit 10 may physically control and actuate the environment of a BAS, which may include the light, heating, air, metering, and water systems of the BAS. End device components may form an integral part of the peripheral unit 10. For example, the peripheral unit 10 may include a valve 14 that moves in a range of open and closed positions to change the flow of water through the BAS.

In accordance with some embodiments, the peripheral unit 10 may have a wireless bus and a processor and memory specifically configured to provide an embedded interpreter based on local programming. The embedded interpreter enables the peripheral unit 10 to be locally programmable to customize the functionality, operation and commands of the peripheral unit 10. The peripheral unit 10 stores and executes programs to control the functionality, operation and behavior of the peripheral unity 10. The programs may be updated, changed and modified via the wireless communication network of the BAS. For example, a controller of the control network may exchange data with the peripheral unit 10. The embedded interpreter provides a control or script engine that supports local scripting and programmability, which may provide distributed intelligence and redundant control solutions in the event of network communication failure. The local scripts and programming that may be pushed to the programmable wireless peripheral devices may also configure normal operation and functionality of the peripheral unit 10. The peripheral unit 10 is programmable to enable real time response to the local scripts and programs residing thereon. The peripheral unit 10 may be used to retrofit an existing building system by adding zone control and the wireless communication bus may not require wires to be installed in the building system specific for this peripheral unit 10. As an example peripheral unit 10, the actuator 12, valve 14 and the embedded interpreter may enable the modulation of water flow in a zone of the BAS based on central or local temperature set points and local temperature sensors. As this example peripheral unit 10 is programmable the valve 14 may be used in a variety of building systems for heating or cooling, such as geothermal systems, chillers or cooling towers, chilled beams and ceilings, water source heat pumps, radiant floors or chilled slabs, and so on. The embedded interpreter may translate programs of a different of formats or representations in a variety of ways. For example, the interpreter may enable live updates to program code using an intermediate code representation, pre-compiled code, just-in-time compilation, and so on.

Figure 2:
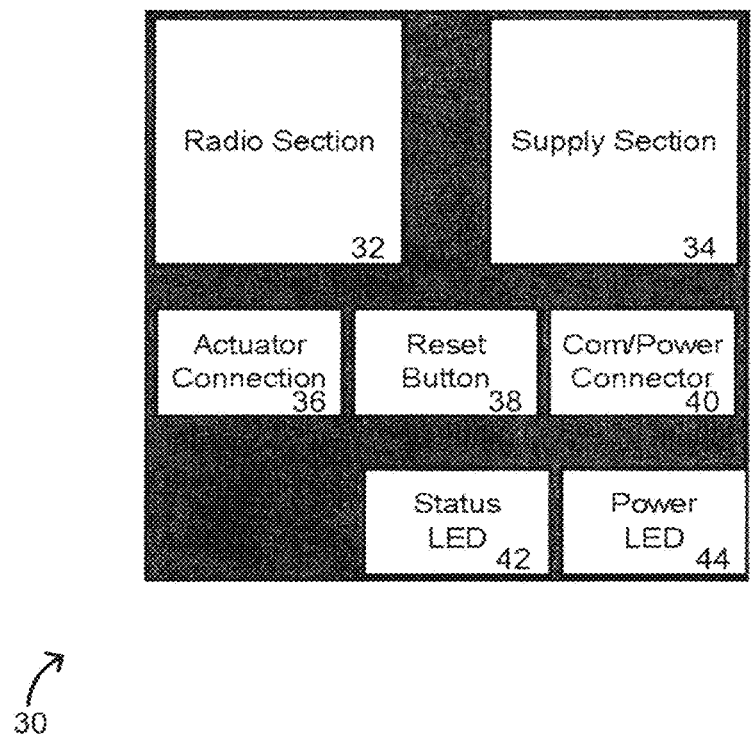
FIG. 2 illustrates a schematic view of the functional modules of an electronic board that may be included in the example embodiment shown in FIG. 1.

Referring now to FIG. 2 there is shown a schematic view of the functional modules of an electronic board 30 that may be included in the example embodiment of the peripheral unit 10 shown in FIG. 1. The functional modules may include a radio section 32, a supply section 34, an actuator connection 36, a reset button 38, a communication and power connector 40, a status LED 42, and a power LED 44.

Figure 3:
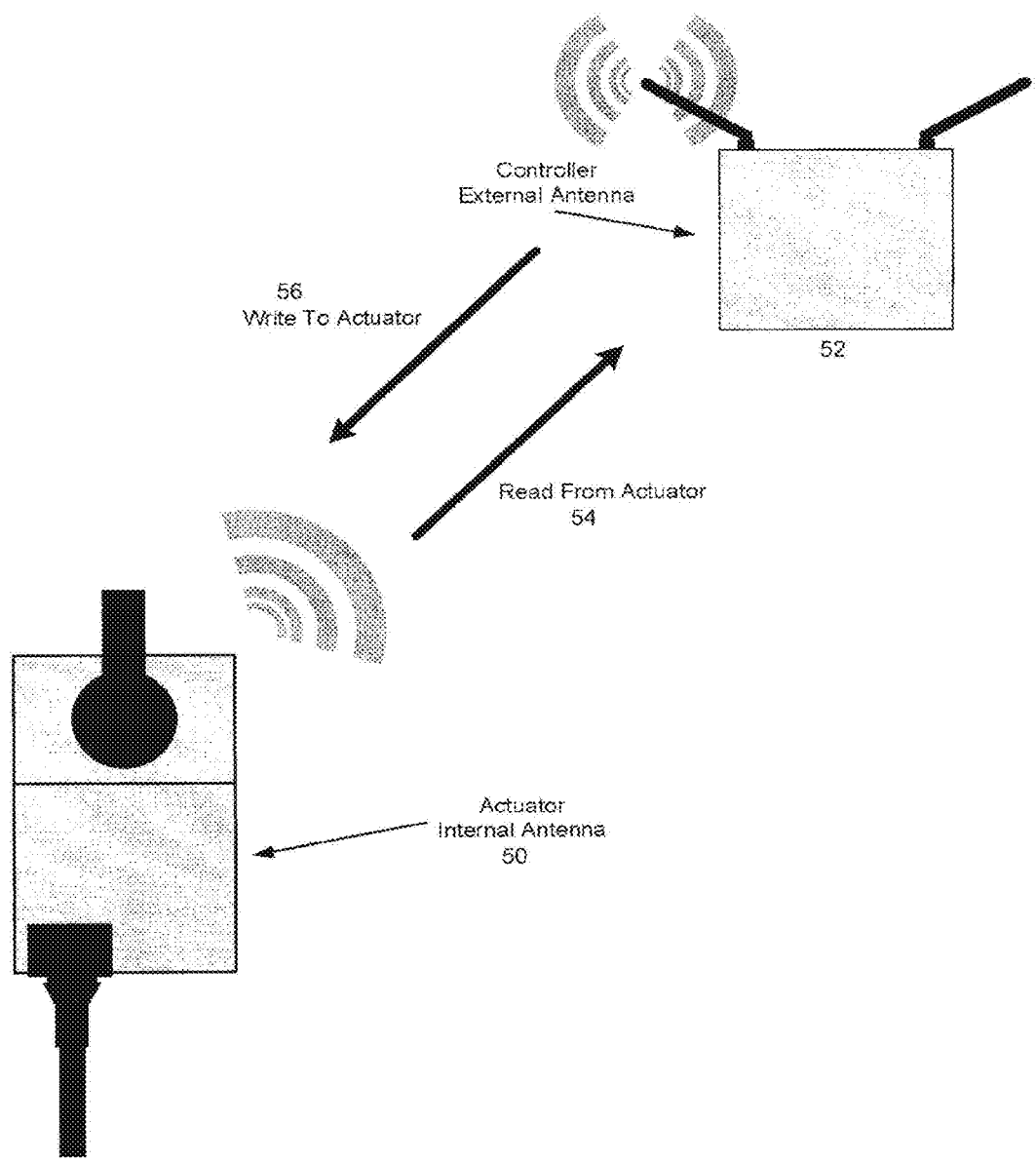
FIG. 3 illustrates an example application of embodiments described herein, where the peripheral unit communicates wirelessly with a controller within a control network.

Referring now to FIG. 3 there is shown an example application of embodiments described herein, where a peripheral unit 50 communicates wirelessly with a controller 52 within a control (or BAS) network. In this example, the peripheral unit 50 is an actuator with an internal antenna. The controller 52 has an external antenna to read data 54 from the peripheral unit 50 and write data 56 to the peripheral unit 50 via the control network. The peripheral unit 50 may have an internal transceiver, such as a Zigbee transceiver, and an antenna, enabling it to communicate with a controller 52, gateway (not shown), other peripheral units (not shown), a central server (not shown), and other components of the BAS. The peripheral unit 50 may be configured for wireless communication, such as Zigbee wireless communication, for example, with a communication stack including, for example, Zigbee pro and a Zigbee cluster library.

The peripheral unit 50 may receive scripts and programs over the wireless network from the controller 52, for example, and store and interpret them locally using the embedded interpreter. The controller 52 can read data from the peripheral unit 50 to check customer variables, such as specified set points, and to determine whether the most up to date script or program resides on the peripheral unit 50. That is, the peripheral unit 50 may communicate wirelessly with other devices of a BAS network, receive programs, commands, and data from the BAS network as well as push data and commands to other devices of the BAS network.

Figure 4:
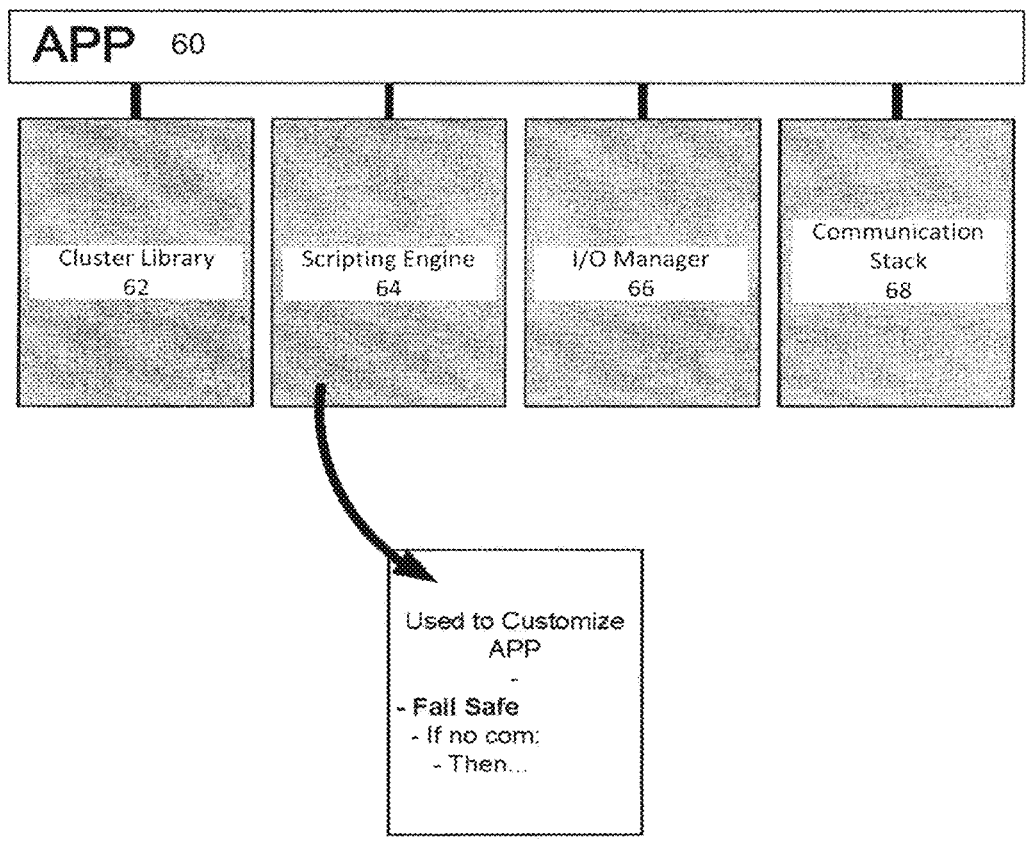
FIG. 4 illustrates a schematic view of the functional modules of peripheral units in accordance with embodiments described herein.

Referring now to FIG. 4 there is shown a schematic view of the functional modules of peripheral units in accordance with embodiments described herein. The functional modules are connected through an application 60 residing in memory of the peripheral unit. The functional modules implement the embedded interpreter and include a cluster library 62, a scripting engine 64, input/output manager 66, and communication stack 68. These components are local to the peripheral unit and reside thereon such that the peripheral unit is programmable with a stand-alone application 60 that can be used to operate and command the peripheral unit for normal operation as well as in the event of network failure.

The cluster library 62 may be a collection of commands, clusters and attributes that have specific meanings. For example, there is an OnOff cluster that defines how to turn something off, on, or toggle it. This cluster works for light switches, pumps, garage door openers and any other device that can be turned on or off. Other clusters include valves, heaters, and so on. The cluster library 62 may be a Zigbee cluster library. The cluster library 62 may define functional and application specific domains, and commands, clusters, and attributes specific to those domains. The cluster library 62 may also include the user or customer's data, such as customer variables, including set points, default values, fail safe values, normal operation values, customized operation values, scripts, and programs.

The scripting engine 64 is used to customize the peripheral device, and process code locally on the peripheral device. The peripheral device receives scripts and programs wirelessly from the BAS network, and stores the scripts and programs in memory so that the scripting engine 64 can locally run the scripts and programs. That is, the scripting engine 64 enables the peripheral device to locally process received scripts and programs. The scripting engine 64 enables to peripheral device to be fully programmable with a stand-alone application 60 in the event a network connection is lost.

For example, the scripting engine 64 may define a default mode of operation for the peripheral device and a fail safe mode of operation which is activated in the event of network failure. The scripting engine 64 is not limited to fail safe or fall back mode and may also configure normal mode of operation. The scripting engine 64 processes scripts and programs residing on the peripheral device, and sends commands to the input/output manager 66 in response. The input/output manager 66 manages the data that is received by the peripheral device, such as scripts and programs, and controls the peripheral device output, such as activation of an actuator to change a valve position, adjusting the temperature of a heater or cooler, turning off a light, and so on. The communication stack 68 defines a computer networking protocol for the peripheral device, including a definition of the protocols, and the software implementation of them.

The peripheral unit's scripting engine 64 enables local programmability and customizable behavior, behavior that may be customized to a particular user or application, and that may be changed on the fly by a user by sending new command, scripts and programs to the peripheral unit.

For example, customization behavior may include a default or normal mode of operation of the peripheral device and a fail-safe mode. That is, customization behavior may include fail safe operations as well as normal operations. The local intelligence may customize the peripheral device it resides on and may also customize other peripheral devices that are connected thereto by pushing commands out to the other peripheral devices. The other peripheral devices may be referred to as slave devices. The other peripheral devices may not have local intelligence but still have communication capabilities for receiving commands. The communication capability may include wired communication, wireless communication, or other digital or analog input/output such as a peripheral device with 0-10V output (feedback) that can control slave valves having 0-10V input. For example, the peripheral device may be programmed to control the water flow provided by multiple valves. The peripheral device may command its own valve to a fixed set point or position, and then command other connected valves to other set points or positions to maintain a specific water flow. The peripheral device may control the valve position or set point based on the temperature, and may further include a temperature sensor. The scripting engine 64 may also automatically diagnose the network connection and if there is none, it may issue a command to the peripheral device such as a reset or a switch to fail safe mode, for example. The scripting engine 64 may also switch to a normal mode or different mode of operation. The scripting engine 64 may be configured with a counter so that after a particular amount of time has passed the peripheral device recalibrates. As another example, the scripting engine 64 may command a heater to change temperatures. Further examples include using input to monitor piping and determine whether piping is frozen in AC applications, and measuring energy usage by mounting the actuator on a valve with an opening proportional to flow, and monitoring before and after temperature. The programs may also calculate energy consumption for sub-metering applications, and so on. The peripheral unit 10 may use an interpreter to translate programs of a different of formats or representations in a variety of ways. For example, the peripheral unit 10 and its interpreter may be configured to provide just-in-time compilation.

The peripheral unit's programmability may compensate for loss of wireless communication during a network disconnect when otherwise, the peripheral unit may be stuck or fixed at the same position or set point during network failure. The peripheral unit may be programmed locally with a fail safe operation mode, as well as a normal operation mode. For example, the peripheral unit may close a valve in fail safe operation mode or keep the building temperature within a specific range. That way, in the event of communication failure the peripheral unit is not stuck at the same set point or position at the time of communication failure and can continue to function using a stand-alone local application 60 until communication resumes. The programmability is not limited to fail safe mode and may also configure a normal mode of operation. For example, control sequences may be implemented such as management of external sensors or actuators, reaction to external sensors or actuators, and so on. For a wireless peripheral unit 10 control sequences local to the peripheral unit 10 may avoid or reduce latency for transmission of the code.

The peripheral unit may have local input/output connected to local sensors, which may enable the scripting engine 64 to program fall-back behavior based on local sensor reading.

The peripheral unit local memory, processor and scripting engine 64 may provide an embedded interpreter for distributed intelligence and redundancy. The peripheral unit can continue to function according to the local programs and scripts even if the BAS network connection fails, thereby maintaining efficiency until the BAS networks resumes. The peripheral unit 10 may use an interpreter to translate programs of a different of formats or representations in a variety of ways. The peripheral unit 10 and its interpreter may enable live updates to program code by using an intermediate code representation, pre-compiled code as part of the interpreter, just-in-time compilation, and so on.

Figure 5:
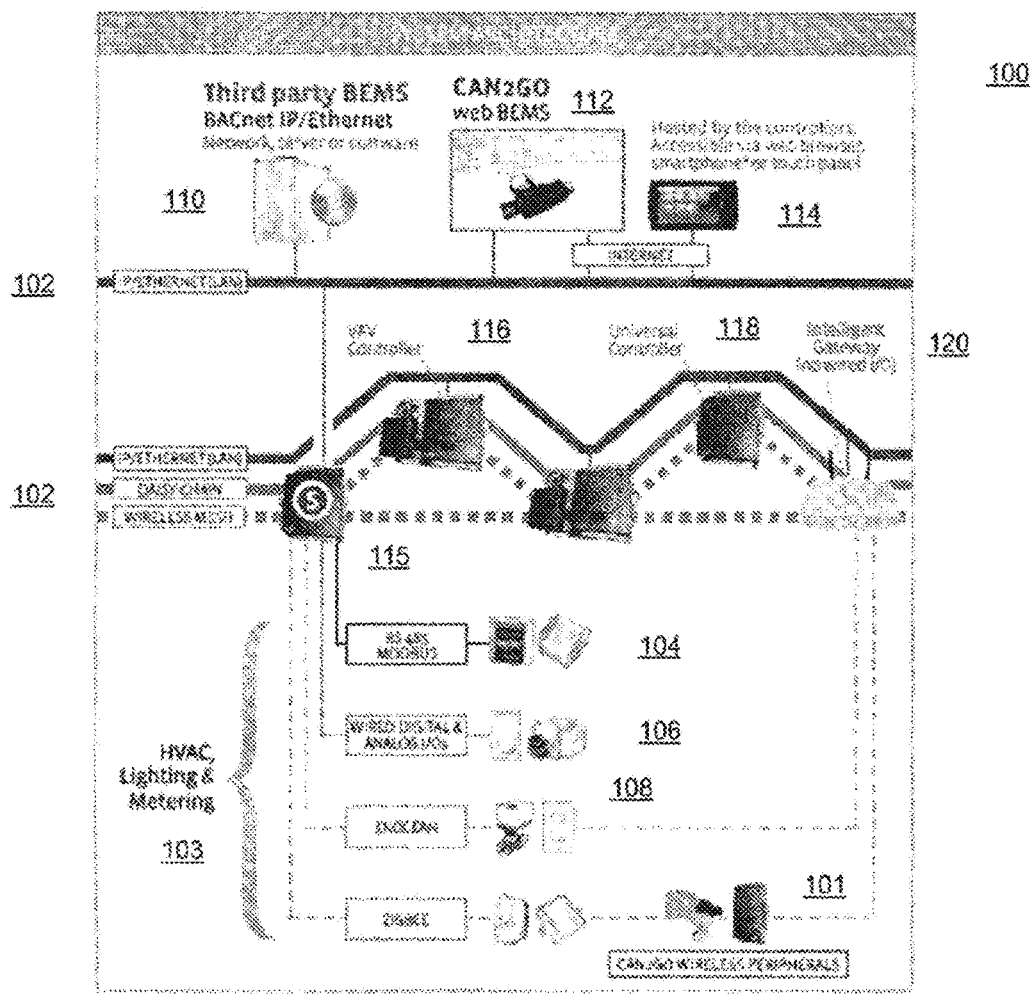
FIG. 5 illustrates a building automation system in accordance with embodiments described herein.

Reference is now made to FIG. 5 which illustrates a BAS 100 in accordance with embodiments described herein.

The BAS 100 includes peripheral units 101. The peripheral units 101 are programmable and may be wirelessly connected to the control network 102. An example peripheral unit 101 in accordance with embodiments described herein may provide a scriptable wireless actuator, where scripts and programs may compensate for communication losses so that the peripheral unit can function in the event of such communication losses. Accordingly, by way of example a peripheral unit 101 may be an actuator. The actuator may be a digital actuator. The actuator may be connected to and control a valve, such as by moving the valve to different positions and set points. The valve may control a mechanical element of a building, such as the heating, cooling. and so on. The actuator may control a mechanical element of a building, such as heating, cooling, and so on.

In accordance with embodiments described herein, a peripheral unit 101 may be a temperature sensor. The temperature sensor may be equipped with a set-point. For example, the temperature sensor equipped with a set-point may be used as a thermostat.

In accordance with further embodiments described herein, a peripheral unit 101 may be an application-specific input/output device. By way of example, the application-specific input/output device may be used to control a fan coil, a variable air-volume (VAV) box, a variable volume and temperature (VVT) box.

In accordance with embodiments described herein, a peripheral unit 101 may be a relay pack. For example, the relay pack may be used to control lighting or heating.

Various combinations of types of peripheral units 101 may be used in BAS 100 and connected to the control network 102. Example types of peripheral units may include: an actuator with an embedded interpreter, a digital actuator with embedded interpreter, a valve with embedded interpreter, a relay with embedded interpreter, a motor with embedded interpreter, a heating system valve with embedded interpreter, a digital actuator with embedded interpreter, a digital actuator with customizable behavior, a digital actuator with customizable fallback behavior, a wireless actuator with embedded interpreter, a wireless actuator with customizable behavior, a wireless actuator with customizable fallback behavior, a wired actuator with embedded interpreter, a wired actuator with customizable behavior, a wired actuator with customizable fallback behavior, and so on. These are examples only and other types of peripheral units 101 and other configurations may also be provided by embodiments described herein. The embedded interpreter may translate programs of a different of formats or representations in a variety of ways. For example, the interpreter may enable live updates to program code using an intermediate code representation, pre-compiled code, just-in-time compilation, and so on.

The peripheral units 101 may be wirelessly connected to the control network 102 and communicate using the Zigbee protocol, for example. The peripheral units 101 may include end device components for actuating the building environment, and may form part of different systems operating in the building such as the HVAC, lighting, and metering systems 103, for example. End devices that may be used in the BAS 100 and the HVAC, lighting, and metering systems 103 systems include EnOcean devices 108, wired digital and analog input and output devices 106, and Modbus devices, each of which may be connected to the control network 102 using various connection mechanisms such as wireless mesh, daisy chain and IP/Ethernet (LAN), for example.

The BAS 100 may also include controllers such as a VAV controller 116, universal controller 118, and intelligent gateway controller 120, that are fully programmable with local storage and can manage the HVAC, lighting, and metering systems 103. The intelligent gateway controllers 120 may convert data and commands relating to end devices into other communication objects, such as SAC net objects using embedded BAC net gateways. The controllers also include a server 115 that is connected to the control network 102 to access a web BEMS 110 and manage the entire control network 102. The web BEMS 110 and portable devices 114 connected thereto may provide an interface such as a web browser, smartphone or touch panel interface, accessible via the control network 102 or online via a secure network, such as secure virtual private network, to provide centralized control, monitoring and local programming of each controller 115, 116, 118, 120 and peripheral units 101, and other end devices 104, 106, 108.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made.

What is claimed is:

1. A peripheral unit comprising:
one or more end device components that physically actuate a building environment;
a wireless transceiver for wirelessly receiving, by a network communication, programs that define commands for operation of the end devices and transmitting data;
a local memory for storing the programs; and
a processor configured to provide an embedded interpreter to process the programs to command the end device components, the embedded interpreter including a cluster library to define functional and application specific domains, commands, clusters, and attributes, a scripting engine to locally run programs, an input/output manager to manage the programs received by the peripheral device and output commands to the end devices, and a communication stack to define a computer networking protocol for the peripheral device the local memory and the embedded interpreter configured to be capable of storing and processing the programs to command the one or more end device components to actuate the building environment during a loss of network communication.

2. The peripheral unit of claim 1 further comprising sensors for reading building environment values and providing the building environment values to the memory and the processor.

3. The peripheral unit of claim 1 wherein the end device components include an actuator and a valve.

4. The peripheral unit of claim 1 wherein the programs define a normal mode of operation and a fail safe mode of operation, wherein the fail safe mode of operation activates when a network failure is detected.

5. The peripheral unit of claim 1 wherein the end device components include a temperature sensor.

6. The peripheral unit of claim 1 wherein the end device components include an application specific device used to control at least one of a fan coil, a variable air-volume box, and a variable volume and temperature box.

7. The peripheral unit of claim 1 wherein the end device components include a relay pack used to control lighting or heating.

8. The peripheral unit of claim 1 wherein the embedded interpreter comprises a just-in-time compiler to compile intermediate representations of the programs to machine code at runtime to command the end device components.

9. A method for programming a peripheral device:
providing a memory and a processor on a peripheral device, wherein the peripheral device comprises end device components that physically actuate a building environment, wherein the processor is configured to provide an embedded interpreter to command the end device components, the embedded interpreter including a cluster library to define functional and application specific domains, commands, clusters, and attributes, a scripting engine to locally run programs, an input/output manager to manage the programs received by the peripheral device and output commands to the end devices, and a communication stack to define a computer networking protocol for the peripheral device;
wirelessly receiving a program at the peripheral device, via a communication network, wherein the program defines commands for the end devices;
storing the program in the memory; and
using the processor configured to provide the embedded interpreter to process the program and command the end devices during a period of communication network loss.

10. The method of claim 9 wherein the programs define a normal mode of operation and a fail safe mode of operation, and wherein the method further comprises, activating the normal mode of operation, detecting a network failure, and switching to the fail safe mode of operation.

11. The method of claim 9 wherein the peripheral unit comprises sensors and wherein the method further comprises reading building environment values using the sensors, providing the building environment values to the memory and the processor, and transmitting the building environment values.

12. The method of claim 9 further comprising wirelessly transmitting building environment data received from the end devices.

13. A computerized building automation system comprising:
peripheral units with a wireless communication transceiver, end device components that physically actuate a building environment, memory for storing programs and a processor configured to provide an embedded interpreter to command the end device components using the programs, the embedded interpreter including a cluster library to define functional and application specific domains, commands, clusters, and attributes, a scripting engine to locally run programs, an input/output manager to manage the programs received by the peripheral device and output commands to the end devices, and a communication stack to define a computer networking protocol for the peripheral device; and
controllers with a wireless communication bus to wirelessly provide the programs to the peripheral units, wherein the program defines commands for the end device components capable of being processed by the processor to command the end device components to actuate a building environment during a loss of the wireless communication.

14. The computerized building automation system of claim 13 wherein the peripheral units receive the programs from the controllers and transmit the programs to other peripheral devices.

15. The computerized building automation system of claim 13 wherein the programs define a normal mode of operation and a fail safe mode of operation, wherein the fail safe mode of operation activates when a network failure is detected.

16. The computerized building automation system of claim 13 wherein the programs define commands for operation of the end devices of the peripheral devices.

17. The computerized building automation system of claim 13 wherein the end device components provide one or more of HVAC, lighting, metering, heating, cooling, air, water systems for the building.

\* \* \* \* \*